L. C. BONELLI.
AIR PIPE COUPLING.
APPLICATION FILED SEPT. 23, 1916.
1,249,009.
Patented Dec. 4, 1917.
2 SHEETS—SHEET 2.
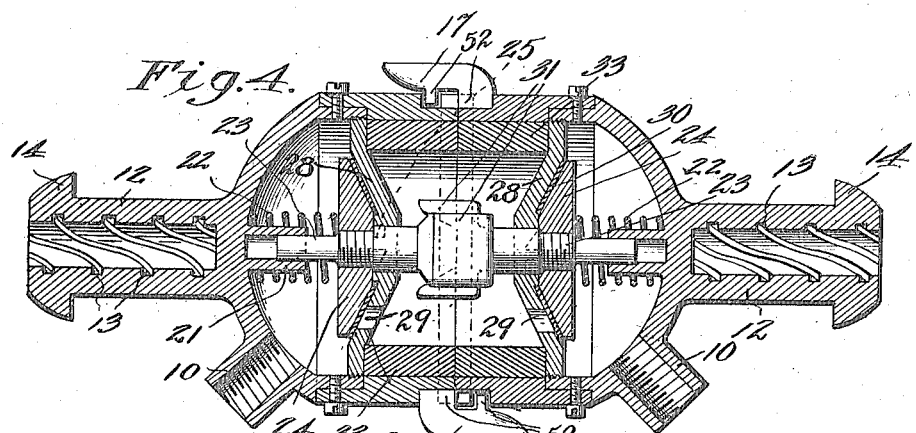
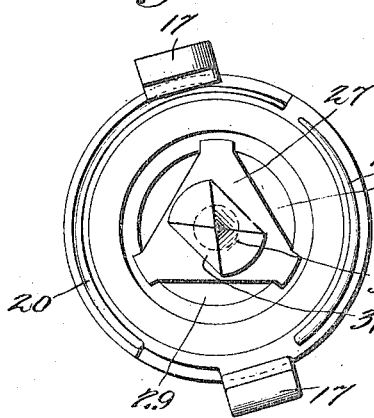
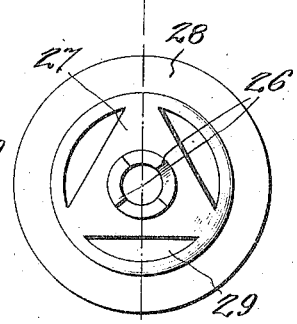
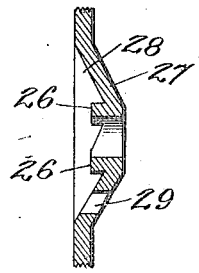
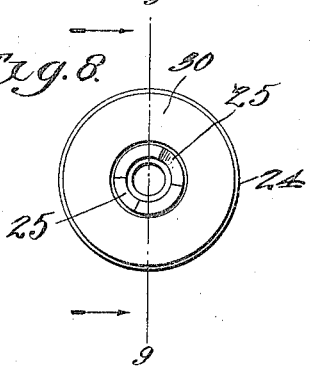
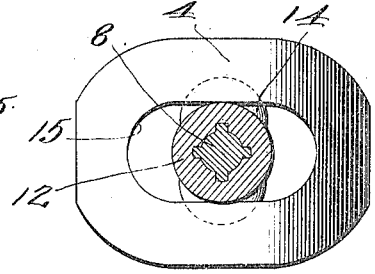

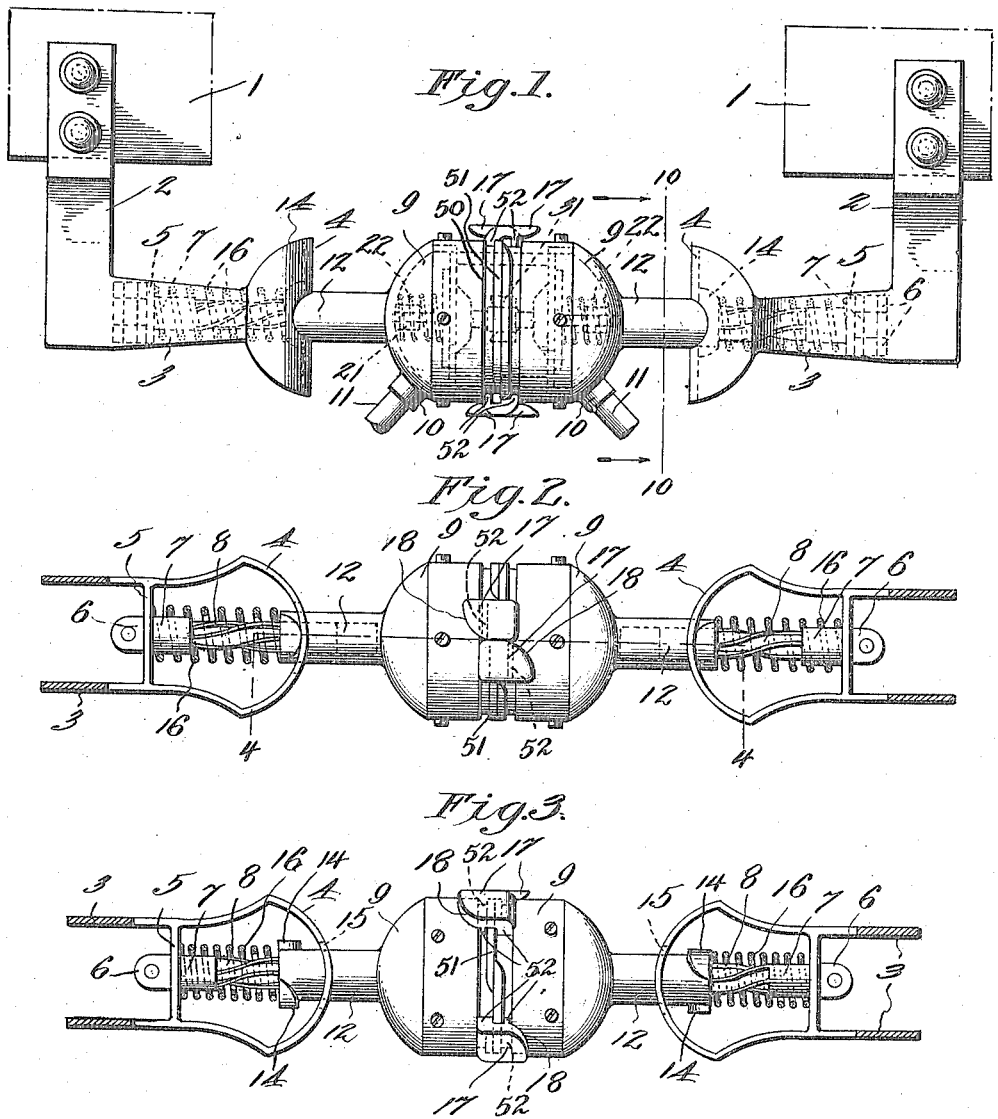

UNITED STATES PATENT OFFICE.

LIBORIO C. BONELLI, OF SAN ANTONIO, TEXAS.

AIR-PIPE COUPLING.

1,249,009.           Specification of Letters Patent.      Patented Dec. 4, 1917.

Application filed September 23, 1916.   Serial No. 121,772.

*To all whom it may concern:*

Be it known that I, LIBORIO C. BONELLI, a subject of the King of Italy, residing at San Antonio, in the county of Bexar and State of Texas, have invented new and useful Improvements in Air-Pipe Couplings, of which the following is a specification.

The present invention relates to improvements in couplers for air or other fluid pipes. The improvement is primarily designed for connecting the fluid pipes of an air brake system between the locomotive and coaches of railway trains, but is, of course, susceptible for use in other connections, and the primary object of the invention is to produce a coupling wherein the coupler heads will engage, one with the other, to provide a tight joint between the same before the valves for the fluid are actuated to open the same, and whereby a positive connection between the air pipes will be obtained without danger of the escape or loss of the fluid and the detrimental influence upon the braking system effectively obviated.

It is a further object of the invention to provide automatic means whereby two fluid pipes may be connected to insure the passage of the fluid therethrough, and whereby when the said coupler members are brought away from each other the fluid passage therethrough will be instantly and automatically stopped.

It is a still further object of the invention to produce coupling members for fluids or like bodies under pressure, which includes co-engaging hollow or cup-like heads provided with interengaging elements which co-engage when the said heads are brought together and so form an air tight joint between the said heads, each of the said heads being provided with a nipple member connected with the source of supply and each of the said heads having arranged therein a valve provided with a stem and the stem of each of the said valves being arranged to interengage and to operate the valve after the coupling heads have been brought to interlocking position, and thereby to prevent the escape of the fluid from between the heads of the coupler and to positively insure the passage thereof through the nipples, and consequently through the pipes connected with the nipples and arranged within the system, so that the brakes, when the device is employed upon railway coaches, or the like, will be positively and instantaneously applied.

It is a still further object of the invention to produce a coupling means for air brake systems wherein each of the coupler members includes a hollow head to which one of the inlet pipes of the system is connected, to provide means whereby the said heads may be movable in a horizontal direction, to provide each of the heads with directing fingers that are adapted to co-engage, when the said heads are brought together, whereby to partially revolve the heads to permit interengaging elements upon the said heads associating and form an air-tight joint between the heads, each of the heads being provided with a ported valve seat and a spring pressed valve engaging the seat and closing the port thereof, the stems of the said valves being forked or otherwise formed with interengaging elements whereby to engage one another to unseat the respective valves after the head members have been brought to interlocking engagement, means being provided for returning the head and the valve to their initial position when the device is uncoupled.

It is a still further object of the invention to produce a coupling for an air brake system, or the like, including hollow heads connected with the main pipes of the system and being pivotally secured to a suitable support, whereby the same may be readily and automatically brought into interengagement, each of the heads being provided with spaced tongues and grooves that, when the said heads are brought together, are disposed to interengage and to be guided into such engagement by suitable directing fingers upon the said head, each of the said heads having arranged therein a ported valve seat, the seat of the said valve being cam-shaped and a spring pressed cam-shaped valve engaging the seat and closing the ports of the said seat, the said valves being provided with stems that pass centrally through the seats and which have their outer ends forked so that when the forked end of one of the stems engages with the other forked end of the other stem, after the coupling heads have been connected, the valves will be forced from their seats and a continuous flow of fluid through the heads will be provided.

With the above and other objects in view, which will more readily appear, as the nature of the invention is better understood, the same consists in the novel construction, combination and arrangement of parts hereinafter more fully described, illustrated and claimed.

The essential features of the invention involved in the provision of a coupler for pneumatic or similar fluid systems is necessarily susceptible to a wide range in structural modification without departing from the spirit of the invention, but preferable illustrative embodiments of the latter are shown in the accompanying drawings, in which:

Figure 1 is a side elevation illustrating part of two coaches provided with an air brake system having the respective pipes therefor connected in accordance with my invention, Fig. 2 is a top plan view of the same, parts being broken away and parts being shown in section and showing the arrangement of parts when the coupler members are brought together with heads unlocked, Fig. 3 is a view similar to Fig. 2 but illustrating the arrangement of parts when the respective coaches are moved one toward the other, the interlocking of the coupler members completed, Fig. 4 is an enlarged sectional view approximately on the line 4—4 of Fig. 2, Fig. 5 is a front elevation of one of the coupler members, Fig. 6 is a rear elevation of one of the valve seats, Fig. 7 is a sectional view approximately on the line 7—7 of Fig. 6, Fig. 8 is a front elevation of the valve, Fig. 9 is a sectional view approximately on the line 9—9 of Fig. 8, and Fig. 10 is a sectional view approximately on the line 10—10 of Fig. 1.

While in the accompanying drawings I have illustrated the improvement as providing a coupler between the air pipes of an air brake system for railway coaches or the like, it is to be understood that the improvement is not to be thus restricted in its useful application, as the same may be employed with equal efficiency for connecting the pipes of any construction of fluid systems.

In the accompanying drawings the numerals 1—1 indicate the confronting ends of two railway coaches. Connected to the said ends of the coaches and depending therebelow are members 2—2 to which are secured the supporting members 3 of the improvement. Each of the supports 3 preferably comprises a member which is substantially U-shaped in plan, the inner ends of the parallel arms of which being either integrally formed with or connected to the member 2, while the outer or connecting member for the arms of the element 3 is preferably rounded, as indicated by the numeral 4, and a transverse element 5 is connected with and retains the arms of the member 3 in proper spaced relation. The member 5, is provided with spaced ears 6—6 and the said member, between the ears, is slotted, whereby the end of a shaft 7 may be pivotally secured between the said ears and be projected through the slot in the said member 5. The shaft 7 outward of its pivotal connection between the ears is provided with spirally arranged ribs, as indicated by the numeral 8, the purpose for which arrangement will be presently set forth.

As both of the coupler members are of a similar construction and as the same are similarly connected with the supports, and also as the valve mechanism carried by each of the coupler members is substantially of a similar construction, the reference characters indicating the parts of one of the couplers may be taken as equally applicable to the parts of the other coupler.

Each of the couplers includes a substantially cup-shaped head 9 which is of course hollow and which has secured thereon or formed therewith a nipple member 10, connected with a flexible pipe 11 of the air brake system. Formed with each of the heads 9, and arranged centrally thereof and extending rearwardly therefrom is a sleeve 12, the said sleeve having its bore provided with spirally arranged grooves 13 and these grooves are adapted to co-engage with the spiral ribs 8 upon the member 7. The sleeve 12 has its outer end formed with an enlargement or head 14, the sleeve proper being arranged in an elongated opening 15 in the arcuate connecting member or end 4 for the arms of the support 3. Surrounding the shaft 7 and exerting a pressure between the member 5 and the head 14 of the sleeve 12 is a helical spring 16 which is adapted to normally force the head 9 to a determined position away from the support 3.

The confronting ends of the heads of the respective coupler members are each provided with outwardly extending directing fingers 17, the contacting corners of the said fingers being rounded in opposite directions as indicated by the numerals 18, whereby when the heads are brought together, the same will be imparted a rotary movement in opposite directions, it being understood that the spirals 8 of the shaft 7, and the spiral grooves 13 in the sleeves 12 of the respective coupler heads are oppositely disposed and therefore a contacting engagement between the heads will cause the said heads to be rotated against each other but in opposite directions, and it will be further understood that as long as sufficient pressure is retained between the heads as to overcome the pressure of the springs 16, the said heads will be retained in co-engaging relation.

To insure the interlocking of the heads when the same are forced against each other, as when the cars are brought together, in coupling, and when the air brake system of the respective coaches is to be connected, I provide the outer or confronting edge of each of the said heads with a tongue 19 which may be wedge-shaped, or in other words, gradually decrease in width from one of its ends to its opposite end, and further I arrange upon each of the heads, diametrically opposite the said tongues 19, a groove 20, and the opposing walls of the said groove may, if desired, decrease in width from one of the ends of the groove to the other end thereof. The tongue of each of the heads is designed to be received in the groove of the other or confronting head and serve as guiding means for the heads when the same are rotated as well as means for preventing the lateral disalinement of the heads.

Each of the heads at the outer ends thereof is provided with a continuous depressed portion 50 and formed in the said depressed portion at the outer ends of the said heads are circumferentially arranged spaced ribs 51, two of such ribs being provided upon each of the heads and the ends of the said ribs being suitably spaced to permit of the directing fingers 17 being arranged therebetween when the coupler heads are brought together. The fingers 17 are provided with depending lugs 52 which when the coupler heads are rotated are designed to travel in the annular channels formed by the peripheral depressions 50 and the ribs 51 to effect in locking the heads associated.

Each of the heads 9 upon the inner or end wall thereof is preferably centrally provided with a lug 21 to receive one end of a convolute spring 22. The other end of this spring surrounds the inner end of a stem 23 which is connected to a valve 24. The valve is preferably in the nature of a flat disk-shaped member and has its inner or seating face formed with oppositely disposed cam-shaped enlargements 25—25, the said cam-shaped surfaces normally contacting with similar cam-shaped surfaces 26 upon the central and outwardly bulged portion 27 of a valve seat 28. The stem 23 projects centrally through the referred to bulged portion 27 of the valve seat 28, and the sides of the said bulged portion are provided with ports or openings 29, the said openings being normally closed by the valve 24. The seating face of the valve is provided with a compressible gasket 30, whereby to insure the proper seating of the valve, the valve being normally retained seated and closing the ports 29 through the medium of the spring 22.

The outer ends of the respective stems 23 of the valves 24 are enlarged or otherwise provided with heads 31, and preferably, and as disclosed by the drawings, the said heads are slotted to form the same with oppositely arranged fingers 32, the fingers 32 of the respective valve stems being normally retained at a right angle with relation to each other and the confronting or contacting edges of the said fingers of the respective valves being preferably inclined or beveled to engage and longitudinally associate the respective valves when the heads are brought together. The valve seats 28 being secured to the respective heads, of course, turn in unison with the said heads and when the fingers 32 of the valve stems are associated as just described, the turning of the valve seats cause its cam elements 26 to ride over the cam elements 25 of the valves 24, causing the said valves as well as the stems thereof to move longitudinally in an unseating direction to uncover the ports 29 in the valve seats 28, and consequently permit of the fluid passing through the nipples of the respective heads and through the said heads.

In addition to the co-engaging tongues and grooves in the heads, which, it is to be understood, are not necessarily tapered, I arrange within each of the hollow heads a compressible ring 33, and the ends of these rings are adapted to contact when the heads are brought into interlocking engagement, and thus the tight engagement between the heads and the positive sealing of the joint therebetween is more effectively insured.

The construction of the device is such that the contacting engagement of the compressible rings 33 insure an air tight connection between the coupler heads before the valve stems are actuated to unseat the valve, so that an air tight joint is provided between the said coupler heads before the ports in the valve seats are uncovered, and by the interlocking engagement with the lugs 52 of the fingers 17 with the ribs 51 of the heads 9, it will be readily apparent that the escape of the fluid will be positively prevented.

It will be apparent that by rounding the corners of the fingers 17 as illustrated in the drawings, the same, should the heads be slightly out of alinement, will serve as directing elements when contacting one with the other to partially turn the said heads and to permit of the contacting edges of the fingers sliding one upon the other to bring the said heads into proper contacting relation.

The construction is comparatively simple and may be readily applied to any system wherein fluid pipes are to be automatically connected, and the advantages of the coupler will, in view of the foregoing description, be apparent to those skilled in the art to which such invention appertains without further detailed description.

Having thus described the invention, what I claim is:

1. In a coupling means for penumatic or similar pipes, supports, pivoted elements upon the supports, hollow heads associated with said elements and disposed for rotary movement thereon when the heads are brought into contacting engagement, directing means for the heads, interlocking means for the heads, valves in the said heads and normally closing the air pipes therefor, and means, comprising mechanism associated with the valves for unseating the same after the heads are connected.

2. In a coupler for penumatic or similar systems, a support, a spiral shaft pivoted to said supports and movable laterally thereon, a hollow coupler head having a sleeve provided with a spiral bore receiving the shaft, spring means between the shaft and sleeve, directing fingers for the hollow head, a tongue upon one side of the outer end of the head, a groove upon the other side of the said end of the head whereby, when two of such heads are brought to contacting position the tongue of one of the heads will be received in the groove of the other head, and the said heads rotated by the virtue of such contact upon the spiral shaft, fluid pipes connected with the head, a ported valve seat within the head, a spring-pressed valve for closing the seat, a stem for the valve and disposed for contacting relation with the stem of the valve of the co-acting coupler thereby to unseat the valves when the coupler heads have been brought to interlocking engagement.

3. In a coupler for pneumatic or similar pipes, a support for each of the couplers, a spiral shaft pivotally secured to each of said supports and laterally movable with respect to said supports, a hollow coupler head connected with the pneumatic system, a sleeve having a spiral bore for each of the heads and co-engaging with the respective spiral shafts, tension means between the shafts and sleeves, a spring pressed valve in each of the heads, a ported seat for each of the valves, a stem for each of the valves passing centrally through each of the seats, and said stems having interengaging heads adapted to co-act to unseat the respective valves when the coupler heads have been brought to interlocking engagement.

4. In a coupling means for pneumatic or similar systems, oppositely disposed hollow heads arranged for contacting engagement, means for permitting a limited longitudinal and rotary movement of the heads when the latter are brought into contacting relation, interlocking means upon the heads co-engaging when the said heads are brought together, means for releasing the interlocking means when the heads are brought away from each other, a pneumatic pipe connected with each of the heads, a valve seat having a cam member arranged thereon in each of the heads, a valve for said seat, a cam member upon said valve designed to co-act with the cam member of the valve seat, spring means for seating the valve, and means comprising contact elements designed to be actuated upon the rotary movement of the coupler heads to unseat the valve.

5. In a means for connecting two pneumatic or similar pipes, supports, spiral shafts pivoted to the supports and laterally movable thereon, hollow head members, sleeves having spiral grooves for each of the head members and arranged to engage with the spiral shafts, the ends of the sleeves being enlarged whereby to limit the longitudinal movement thereof with respect to the supports, tension means between the supports and the sleeves, cam-shaped directing fingers upon the ends of the heads, tapered tongues upon the ends of the heads, tapered grooves upon the ends of the heads, a pipe member communicating with each of the heads, a ported valve seat for each of the heads and having an inner cam-shaped surface, a valve having a cam-shaped surface co-engaging with the cam-shaped surface of the valve seats, a stem for each of the valves projecting centrally through the valve seats, spring means for normally retaining the valves seated, the valve stems having their outer ends formed with slotted heads providing fingers designed to interengage and by virtue of such engagement to simultaneously rotate with the turning of the heads and to be moved longitudinally away from each other when the cam surfaces of the valves are thus brought to travel over the cam surfaces of the valve seats in the unseating of the valves.

In testimony whereof I affix my signature.

LIBORIO C. BONELLI.

Copies of this patent may be obtained for five cents each, by addressing the "Commissioner of Patents, Washington, D. C."